US008127274B2

(12) United States Patent
Astheimer (10) Patent No.: US 8,127,274 B2
(45) Date of Patent: Feb. 28, 2012

(54) DYNAMIC INTERVENTION WITH SOFTWARE APPLICATIONS

(75) Inventor: Peter Astheimer, Glasgow (GB)

(73) Assignee: ITI Scotland Limited, Glasgow (GB)

( * ) Notice: Subject to any disclaimer, the term of this patent is extended or adjusted under 35 U.S.C. 154(b) by 1300 days.

(21) Appl. No.: 11/810,889

(22) Filed: Jun. 7, 2007

(65) Prior Publication Data
US 2008/0134170 A1 Jun. 5, 2008

(30) Foreign Application Priority Data
Dec. 1, 2006 (GB) .................................. 0624033.7

(51) Int. Cl.
*G06F 9/44* (2006.01)
(52) U.S. Cl. ....................................... 717/120; 717/107
(58) Field of Classification Search .......... 717/104–107, 717/120, 175
See application file for complete search history.

(56) References Cited

U.S. PATENT DOCUMENTS

| 5,174,759 | A | 12/1992 | Preston et al. |
|---|---|---|---|
| 5,224,861 | A | 7/1993 | Glass et al. |
| 6,386,883 | B2 | 5/2002 | Siefert |
| 6,477,437 | B1 | 11/2002 | Hirota |
| 6,559,867 | B1 | 5/2003 | Kotick et al. |
| 6,606,480 | B1 | 8/2003 | L'Allier et al. |
| 6,652,376 | B1 | 11/2003 | Yoshida et al. |
| 6,658,398 | B1 | 12/2003 | Bertrand et al. |
| 6,785,824 | B1 | 8/2004 | Grassle |
| 6,807,535 | B2 | 10/2004 | Goodkovsky |
| 6,975,833 | B2 | 12/2005 | Theilmann et al. |
| 2001/0034016 | A1 | 10/2001 | Ziv-el et al. |
| 2002/0042756 | A1* | 4/2002 | Kumar et al. ................... 705/26 |
| 2002/0091608 | A1 | 7/2002 | Odegaard et al. |
| 2002/0138456 | A1 | 9/2002 | Levy et al. |
| 2003/0055800 | A1 | 3/2003 | Geoghegan |
| 2003/0207243 | A1 | 11/2003 | Shen et al. |
| 2004/0009461 | A1 | 1/2004 | Snyder et al. |
| 2004/0219504 | A1 | 11/2004 | Hattie |
| 2005/0010574 | A1* | 1/2005 | Vaught ............................ 707/10 |

(Continued)

FOREIGN PATENT DOCUMENTS

EP 0479408 A2 4/1991

(Continued)

OTHER PUBLICATIONS

VIRTOOLS SA: "Virtools™ Dev"[Online] Mar. 16, 2006, pp. 1-2, XP002458824 Retrieved from the Internet: URL:http://web.archive.org/web/20060316085629/www.virtools.com/solutions/products/pd fs/VirtoolsDev_3.pdf> [retrieved on Nov. 16, 2007].

(Continued)

*Primary Examiner* — Anna Deng
(74) *Attorney, Agent, or Firm* — Drinker Biddle & Reath LLP (57) ABSTRACT

A system for teaching a learning objective is provided. The system includes a software application comprising an application logic component and that provides a user view and a facilitator view. An intervention control is arranged to interface directly with the application logic component. A method is also disclosed for teaching a learning objective and includes the steps of executing a software application that includes an application logic component and that provides a user view and a facilitator view; and using an intervention control to interface directly with the application logic component. The system and method may be implemented as part of programmed instructions in a computer system and/or a computer readable medium.

121 Claims, 4 Drawing Sheets

U.S. PATENT DOCUMENTS

| | | |
|---|---|---|
| 2005/0123892 A1 | 6/2005 | Cornelius et al. |
| 2005/0203767 A1 | 9/2005 | Rogan et al. |
| 2005/0233810 A1 | 10/2005 | Chiang |
| 2005/0266907 A1 | 12/2005 | Weston et al. |
| 2006/0024654 A1 | 2/2006 | Goodkovsky |
| 2006/0078863 A1 | 4/2006 | Coleman et al. |
| 2006/0115802 A1 | 6/2006 | Reynolds |
| 2006/0154227 A1 | 7/2006 | Rossi et al. |
| 2006/0188860 A1 | 8/2006 | Morrison |
| 2006/0263756 A1 | 11/2006 | Berger et al. |
| 2007/0174453 A1* | 7/2007 | Donoho et al. ............... 709/224 |
| 2008/0014569 A1 | 1/2008 | Holiday et al. |
| 2008/0050715 A1 | 2/2008 | Golczewski et al. |
| 2009/0124937 A1* | 5/2009 | Parks ........................... 600/593 |
| 2010/0094878 A1* | 4/2010 | Soroca et al. ................. 707/748 |
| 2010/0118025 A1* | 5/2010 | Smith et al. ................... 345/418 |
| 2010/0293490 A1* | 11/2010 | Rousso et al. ................. 715/771 |
| 2010/0332992 A1* | 12/2010 | Donoho et al. ................ 715/736 |
| 2011/0238812 A1* | 9/2011 | Vaught .......................... 709/223 |
| 2011/0252148 A1* | 10/2011 | Pujol et al. .................... 709/227 |

FOREIGN PATENT DOCUMENTS

| | | |
|---|---|---|
| EP | 1049066 A2 | 3/2000 |
| EP | 1208554 B1 | 7/2000 |
| JP | 2002346012 | 3/2002 |
| JP | 2002273049 | 9/2002 |
| WO | WO96/03733 | 2/1996 |
| WO | WO98/52175 | 11/1998 |
| WO | WO00/13158 | 3/2000 |
| WO | WO2004/023428 A2 | 3/2004 |
| WO | WO2004/023430 A2 | 3/2004 |
| WO | WO2006/023153 A1 | 3/2006 |

OTHER PUBLICATIONS

VIRTOOLS SA: "Virtools Dev"[Online] Mar. 16, 2006, pp. 1-4, XP-002458825 Retrieved from the Internet: URL: http://web.archive.org/web/20060316080213/www.virtools.com/solutions/products/virtools_dev_featurees.asp> [retrieved on Nov. 16, 2007].

ITI TECHMEDIA: "Delivering Innovation to Industry"[Online] May 14, 2006, pp. 1-24, XP-002458826 Retrieved from the Internet: URL: http://web.archive.org/web/20060514023114/http://www.ititechmedia.com/uploads/documents/Games$_{13}$ Based_Learning_Information_Pack_for_web.pdf> [retrieved on Nov. 14, 2007].

* cited by examiner

DYNAMIC INTERVENTION WITH SOFTWARE APPLICATIONS

FIELD OF THE INVENTION

The present invention relates to a method of dynamic intervention with a software application and in particular to methods for controlling software applications during runtime in such a way, that the degree of achievement of learning objectives is maximised.

BACKGROUND

A software application is any program run on a computer that enables the user to perform a specific task or function. The types of software application to which this invention applies include without limitation business software such as word processing and spreadsheet programmes, games, learning applications, games-based learning applications and training or simulation applications.

In any software application, there comes a point where a user requires assistance or help. In the field of everyday business applications, help is available in the form of a searchable help database made available either as an integral part of the application or via on-line services. Various "office assistant" programs are also known which give a user prompts when they take specific actions. In a networked environment it is known to provide a "remote desktop" as provided, for example, by Apple Computer Inc, through which a user with appropriate access permissions can remotely control or monitor other computers over the network. This product is aimed at computer administrators responsible for large numbers of computers and learning facilitators who need to assist individuals or perform group demonstrations to help teach a particular learning objective.

In the games environment, text cues and help functions are available either as part of the application or in the case of an online game they can be provided by a remote facilitator. These cues typically appear as pop-up windows which are overlaid on a computer user's display, or appear in a specified pane of the display, separate from the actual game environment. Similar cues exist in training and simulation environments.

In recent times the use of electronic software for learning, that is, for the teaching of a learning objective, has been the subject of increasing attention. As well as the basic service of providing learning materials electronically, one field receiving attention is the field of games-based learning, where a learning application provides a game-like environment to be played by a user with the objective of learning about a particular topic, expressed as a learning objective.

However, the level of interaction that a facilitator can use to customise and maximise the effectiveness of the learning experience is limited by current technologies. Ineffective interaction can result in users of the applications becoming frustrated, exasperated or even giving up on the application altogether.

SUMMARY OF THE INVENTION

According to a first aspect of the present invention there is provided a system for teaching a learning objective comprising:
   a software application comprising an application logic component and that provides a user view and a facilitator view; and intervention control arranged to interface directly with the application logic component.

The system may further include a monitoring system for assessing the performance of a learning objective.

The intervention control may comprise an intervention configuration interface and/or an intervention logic component that provides for an automated response to an output from the monitoring system.

The system can be distributed over one or more computing nodes, and preferably includes a data communications system between at least the software application and the intervention control.

The system may further comprise a data communications system between two or more of the software application, the intervention control and the monitoring system.

The software application may be distributed over one or more computing nodes and may include a data communications system between at least two of a facilitator, a user and the application logic component.

In one preferred embodiment, the distributed environment is a client/server environment.

Alternatively, the distributed environment may be a peer-to-peer environment.

The software application may be concurrently used by one or more users and zero or more facilitators. Preferably, the software application is at least one of: a game, a learning application, a games based learning application or a training simulation.

The intervention control include a cues component for the provision of cues to the user of the software application. The cues component may comprise a cue controller interface arranged to receive input from the intervention control to directly configure and dynamically update the application logic. Preferably, the cue controller interface allows the intervention control to generate a cue as an object for use in the software application.

The cues may be predefined and may be selected from a list by a facilitator and/or the intervention control.

Preferably the parameter values of the cues are configured by the intervention control.

The cues may include one or more of: graphic elements, text elements, audio elements, video elements or haptic elements. In one preferred embodiment, the cues are context-sensitive. In an alternate embodiment, the cues are user-sensitive.

The arrangement of a cue may be computed in relation to a point of reference of an environment of the software application. The relation between a cue and the point of reference may be one of proximity, orientation, relative location, absolute location, presence or absence of other objects and/or users.

Alternately, the particular form of a cue may be computed in relation to an environment of the software application. The relation between a cue and an environment may be one of size, geometry, colour, texture, shading, transparency, material, contrast, or brightness.

In one embodiment, the temporal aspects of a cue are computed in relation to an environment of the software application. The relation between a cue and an environment may be one of appearance time, lifetime, flash rate, number of repetitions, speed, velocity, or dynamic resizing.

The cues may be learning objective-sensitive. A cue may depend on at least one of past achievements, current objectives, targets, schedule for a user or a team of users.

A cue may be used by and/or configured for a single user and/or a group or team of users.

The software application optionally includes an application view component for the transmission of display signals. The display signals may include a view generated for the facilitator from at least one of: part or whole of any user's view of the application including the user's view of a two dimensional or three dimensional virtual environment and user interface controls, and a defined camera view.

Preferably, the display signals comprise multiple views from more than one user or teams of users. The multiple views may be arranged in a tiled or stacked window arrangement on one or more screens.

The display signals preferably include one or more of: camera position information, camera orientation, camera viewing angle, and virtual environment objects.

The display signals may include compressed or uncompressed image data.

The software application optionally includes a component for permitting audio and/or visual communication with one or more users.

The intervention control may include a control component for allocating the usage of controls within the software application between two or more of the user, the facilitator and automatic control by the intervention logic component.

The control component optionally includes a control interface arranged to receive input from the facilitator and/or from the intervention logic component to directly configure and dynamically update the application logic component. The control interface preferably allows a facilitator to define and/or the intervention logic component to generate a control as an object for use in the software application.

The controls may be predefined and may be selected from a list by a facilitator and/or the intervention logic component.

The parameter values of the controls may be configured by a facilitator and/or the intervention logic component.

The controls may include a range of user interface controls, including one or more of menus, single buttons, radio buttons, sliders, 2D (x-y coordinate) input means, 3D (x-y-z coordinate) input means, waypoints input means, text, avatar or virtual character control means for head, body, hands, legs, objects carried by avatar, objects held in hand, object manipulation in the environment, virtual vehicle control means including direction, speed, and virtual creature control means.

In one embodiment, the runtime control over any combination of the controls may be dynamically assigned to any combination of: users, teams of users, facilitators, intervention logic component.

The application logic component may include a conflict arbitration logic component that determines the outcome in the case of simultaneous exercise of two or more control actions.

Preferably, the conflict arbitration logic component comprises one of: facilitator priority, user priority, intervention logic priority, majority, minority, minimum percentage.

The conflict arbitration logic component may consider control actions within a specified time interval to determine the outcome.

The software application may include a feedback mechanism where the status of control by the facilitator control and/or the intervention logic component is displayed to the user.

Optionally, the software application may include a feedback mechanism where the status of control by the user and/or the intervention logic component is displayed to the facilitator.

The monitoring system may be arranged to generate an alarm for the facilitator based on the user's performance in the software application. The performance in the software application preferably is a quantified achievement of one or more learning objectives.

The monitoring system may be arranged to generate an alarm for the intervention logic component in order to trigger an automatic intervention response. The intervention response may be a command to do one of: generate, select, configure, and takes effect on one or multiple of cues, controls, views, and communication actions.

The intervention logic may receive information about the degree of achievement of a user's learning objectives, user actions and the state of the software application, and determines alarms based on these information and logged historic information.

An alarm may be generated based on monitoring one or more of: an activity or inactivity level, the exploration by the user of unknown territory, the action by the user of going around in circles or repeating unsuccessful actions, explicit user requests for intervention, usage of peer support, progress over time and achievement rate, and difficulty level of software application.

The software application may include one or more measured objectives formed from a related group of software application measurements; and is adapted for the assessment of a learning objective, said learning objective being formed from:
the selection of one or more measured objectives;
defined outcome conditions for the measured objectives; and
selected outcome activities that each invoke a command in the learning application.

In one embodiment, a user of the software application may set a preference for a level of intervention to be provided.

Preferably, a facilitator of the software application can set a preference for any user for a level of intervention to be provided.

The user preference may correspond to a variation of learning objective thresholds that define when the monitoring system triggers the alarm.

Optionally, a facilitator may view and intervene in one or more software applications at the same time.

In one embodiment, a user may temporarily or permanently assume the role of a facilitator in a peer support capacity.

The system may further include a component for the correlation of a user or a team profile to a specific software application, said correlation component comprising an instruction set for a computer comprising:
a system for interrogating a user profile and reading a learning objective as a first input;
a system for interrogating the software application and reading a learning objective as a second input;
calculation component for determining a relevance of the first input learning objective to the second input learning objective; and
a system for adapting the software application in accordance with the determined relevance and/or updating the user profile in accordance with the determined relevance.

The system for adapting the software application may comprise instructions for applying a weighting factor to at least one of existing experience data in the user profile related to the learning objective of the software application and performance data related to the subsequent use of the software application.

The calculation component may comprise a semantic profiling component adapted to determine a quantitative similarity of meaning between the first input learning objective and the second input learning objective for use as the relevance.

According to further aspects the invention provides a software application for use with the system of the first aspect, and a computer program product comprising the software application.

According to a further aspect of the present invention, there is provided a method for teaching a learning objective comprising:
   executing a software application comprising an application logic component and that provides a user view and a facilitator view; and
   using an intervention control to interface directly with the application logic component.

The method optionally further comprises the step of assessing the performance of a learning objective with a monitoring system.

The intervention control may comprise an intervention configuration interface and/or an intervention logic component that provides for an automated response to an output from the monitoring system.

The steps of the method may be distributed over one or more computing nodes, and the method comprises the step of communicating data between at least the software application and the intervention control.

The method may further include the step of communicating data between two or more of the software application, the intervention control and the monitoring system.

The software application may be distributed over one or more computing nodes and the method may comprise the step of communicating data between at least two of a facilitator, a user and the application logic component.

In one embodiment, the distributed environment is a client/server environment.

Alternatively, the distributed environment is a peer-to-peer environment.

The software application may be concurrently used by one or more users and zero or more facilitators.

The software application is preferably at least one of: a game, a learning application, a games based learning application or a training simulation.

The intervention control may include a cues component for the provision of cues to the user of the software application. The cues component may include a cue controller interface arranged to receive input from the intervention control to directly configure and dynamically update the application logic.

Preferably, the cue controller interface allows the intervention control to generate a cue as an object for use in the software application.

Optionally, the cues may be predefined and can be selected from a list by a facilitator and/or the intervention control.

The parameter values of the cues may be configured by the intervention control.

Optionally, the cues may include one or more of: graphic elements, text elements, audio elements, video elements or haptic elements.

In one embodiment, the cues are context-sensitive.

Alternatively, the cues may be user-sensitive.

The arrangement of a cue may be computed in relation to a point of reference of an environment of the software application. Preferably, the relation between a cue and the point of reference is one of proximity, orientation, relative location, absolute location, presence or absence of other objects and/or users.

The particular form of a cue may be computed in relation to an environment of the software application. Preferably, the relation between a cue and an environment can be one of size, geometry, colour, texture, shading, transparency, material, contrast, or brightness.

The temporal aspects of a cue may be computed in relation to an environment of the software application. Preferably, the relation between a cue and an environment can be one of appearance time, lifetime, flash rate, number of repetitions, speed, velocity, or dynamic resizing.

In one embodiment, the cues are learning objective-sensitive. Preferably, a cue can depend on at least one of past achievements, current objectives, targets, schedule for a user or a team of users.

A cue may be used by and/or configured for a single user and/or a group or team of users.

Preferably, the method further comprises the step of transmitting display signals to/from an application view component of the software application.

The display signals may include a view generated for the facilitator from at least one of: part or whole of any user's view of the application including the user's view of a two dimensional or three dimensional virtual environment and user interface controls, and a defined camera view.

In one embodiment, the display signals include multiple views from more than one user or teams of users. The multiple views may be arranged in a tiled or stacked window arrangement on one or more screens.

The display signals may include one or more of: camera position information, camera orientation, camera viewing angle), and virtual environment objects.

The display signals may comprise compressed or uncompressed image data.

The method may include the step of audio and/or visual communication with one or more users via the software application.

Preferably, the method further comprises the step of allocating the usage of controls within the software application between two or more of the user, the facilitator and automatic control by the intervention logic component, via a control component provided as part of the intervention control.

The control component may comprise a control interface arranged to receive input from the facilitator and/or from the intervention logic component to directly configure and dynamically update the application logic component.

The control interface may allow a facilitator to define and/or the intervention logic component to generate a control as an object for use in the software application.

The controls may be predefined and can be selected from a list by a facilitator and/or the intervention logic component.

Preferably, parameter values of the controls can be configured by a facilitator and/or the intervention logic component.

The controls may comprise a range of user interface controls comprising one or more of menus, single buttons, radio buttons, sliders, 2D (x-y coordinate) input means, 3D (x-y-z coordinate) input means, waypoints input means, text, avatar or virtual character control means for head, body, hands, legs, objects carried by avatar, objects held in hand, object manipulation in the environment, virtual vehicle control means including direction, speed, and virtual creature control means.

The runtime control over any combination of the controls may be dynamically assigned to any combination of: users, teams of users, facilitators, intervention logic component.

The application logic component may include a conflict arbitration logic component that determines the outcome in the case of simultaneous exercise of two or more control actions. The conflict arbitration logic component may comprise one of: facilitator priority, user priority, intervention logic priority, majority, minority, minimum percentage. Preferably, the conflict arbitration logic component considers control actions within a specified time interval to determine the outcome.

The software application may optionally include a feedback mechanism where the status of control by the facilitator control and/or the intervention logic component is displayed to the user.

The software application may optionally include a feedback mechanism where the status of control by the user and/or the intervention logic component is displayed to the facilitator.

The monitoring system may generate an alarm for the facilitator based on the user's performance in the software application. The performance in the software application may be a quantified achievement of one or more learning objectives.

The monitoring system may generate an alarm for the intervention logic component in order to trigger an automatic intervention response. The intervention response may be a command to do one of: generate, select, configure, and takes effect on one or multiple of cues, controls, views, and communication actions. The intervention logic may receive information about the degree of achievement of a user's learning objectives, user actions and the state of the software application, and determines alarms based on the information and logged historic information.

An alarm may be generated based on monitoring one or more of: an activity or inactivity level, the exploration by the user of unknown territory, the action by the user of going around in circles or repeating unsuccessful actions, explicit user requests for intervention, usage of peer support, progress over time and achievement rate, and difficulty level of software application.

The software application may comprise one or more measured objectives formed from a related group of software application measurements; and is adapted for the assessment of a learning objective, said learning objective being formed from:
  the selection of one or more measured objectives;
  defined outcome conditions for the measured objectives; and
  selected outcome activities that each invoke a command in the learning application.

In one embodiment, a user of the software application can set a preference for a level of intervention to be provided.

Optionally, a facilitator of the software application can set a preference for any user for a level of intervention to be provided.

Preferably, the user preference corresponds to a variation of learning objective thresholds that define when the monitoring system triggers the alarm.

In one preferred embodiment, a facilitator can view and intervene in one or more software applications at the same time.

In one preferred embodiment, a user can temporarily or permanently assume the role of a facilitator in a peer support capacity.

The method may further comprise the step of correlating a user or a team profile to a specific software application, via a correlation component comprising an instruction set for a computer comprising:
  a system for interrogating a user profile and reading a learning objective as a first input;
  a system for interrogating the software application and reading a learning objective as a second input;
  calculation component for determining a relevance of the first input learning objective to the second input learning objective; and
  a system for adapting the software application in accordance with the determined relevance and/or updating the user profile in accordance with the determined relevance.

The system for adapting the software application may include instructions for applying a weighting factor to at least one of existing experience data in the user profile related to the learning objective of the software application and performance data related to the subsequent use of the software application.

Preferably, the calculation component comprises a semantic profiling component adapted to determine a quantitative similarity of meaning between the first input learning objective and the second input learning objective for use as the relevance.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Figure 1:
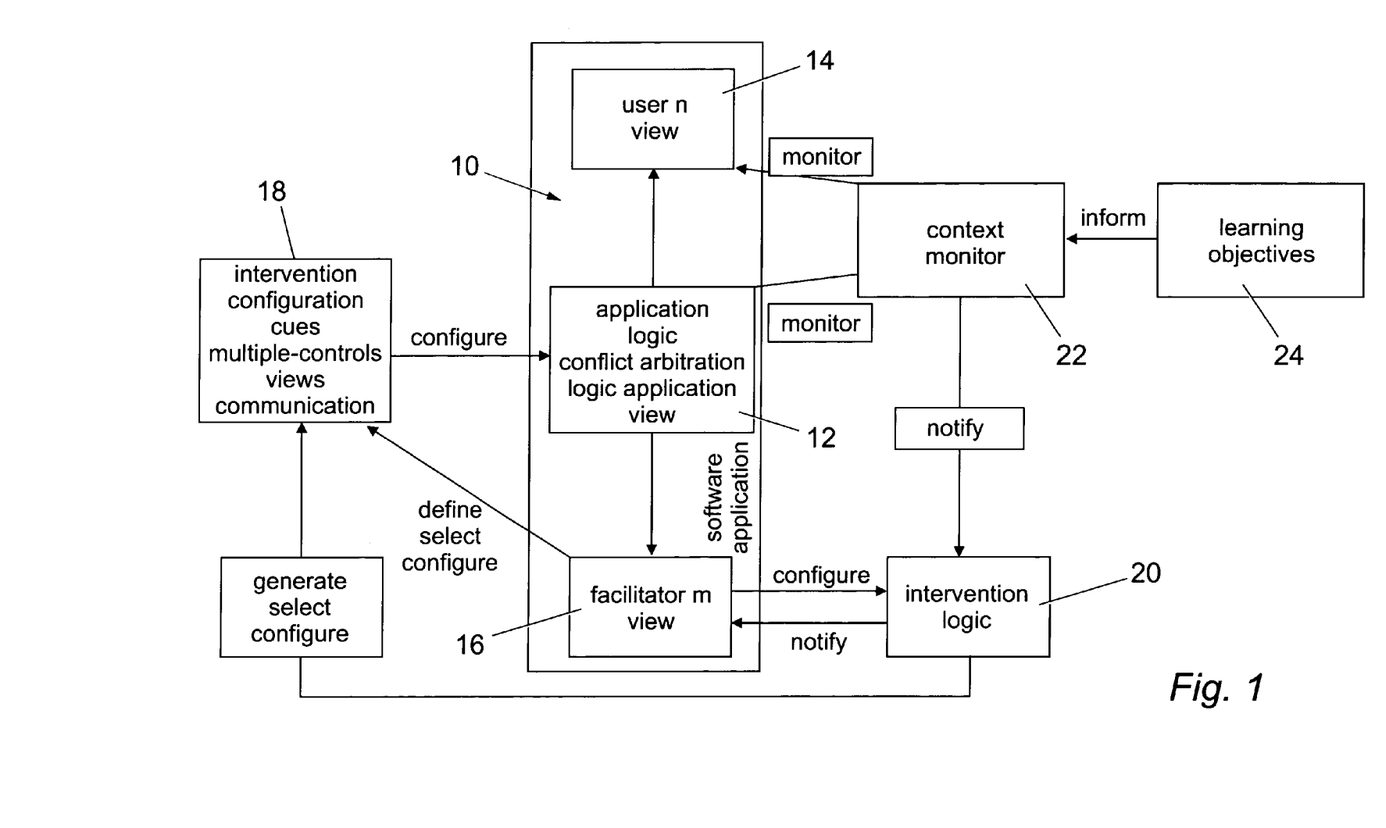
FIG. 1 illustrates a system for implementing an embodiment of the present invention.

The present invention provides for increased dynamism in the adaptation of player experience in software applications. There are a number of different implementation options. One example implementation is illustrated in FIG. 1.

It is useful as an introduction to review the definitions and capabilities of the various people that interact with the system. A designer is a software developer that uses the developer environment shown in FIG. 2 to create a computer game which can take any from that he chooses. For example, it could be a jungle survival game or a world war 2 based first person role-playing game (RPG). No matter the type and theme of the game, it can be used for the measurement and assessment of any learning objective, as described below. The term "game" will generally be interchangeable with the term "learning application", "software application", or "training" or "simulation" applications unless specifically stated otherwise.

A facilitator assists players to learn. He is responsible for establishing and overseeing a learning application event, and for performing event configuration, run-time customization, communication and analysis for assessment. He can also define learning objectives, as discussed below, and is involved in agendas and team meetings, as discussed elsewhere. He generally might not have any technical expertise but does possess expertise in facilitation and analysis for assessment purposes. In one form of the invention, a player can also have full facilitator control so that he can set his own learning objectives, that is, the facilitator and the player can be the same person in an embodiment where the learning application is used for self-assessment.

A learning manager is a facilitator that has more permissions within the system, specifically for managing the game's configurable information and for defining learning objectives. The relative permissions granted to the learning manager and the facilitator can be modified, and as such the learning manager aspect is an optional extra of the system. It may be used for example for a large company, where the learning manager has the overall responsibility for learning, so they define the learning objectives that are to be assessed, leaving it to the facilitators to oversee the actual learning application events and to carry out the assessments. Or, for a smaller company, the distinction between learning manager and facilitator can be dispensed with and the facilitator can have full control permissions for setting configurable information (within the limits previously specified by the game designer), defining learning objectives and monitoring and recording the players' performance during a learning application event.

Finally, the players are the users who use learning application to be taught various skills or topics. The players can be organised into teams and a particular player can be designated as a team leader for the purposes of organising team debriefings and agenda discussions.

Turning now to FIG. 1, a software application 10 comprises an application logic component 12 that acts as a runtime controller for the software application 10. The application logic component 12 comprises conflict arbitration logic and application view subcomponents, which will be described in more detail below. The application logic also provides a user view 14 to one or more users, and a facilitator view 16 to zero or more facilitators.

A "view" exists for a discrete moment in time, where for a user or facilitator all elements of a view of an application are defined. Elements of a view typically include user interface elements and controls (e.g. buttons, menus), visual elements (e.g. a camera view in a 3D virtual world, a 2D map, a video frame), audio elements (e.g. sounds of colliding objects, a narrative) or haptic elements (e.g. jerking joystick when player's vehicle collides with environment). Elements of a view can change over time, e.g. when an interaction is completed, or a game level accomplished.

The system also comprises an intervention control which directly interfaces with the application logic 12. The intervention control in this illustrated embodiment comprises an intervention configuration interface 18 for use by a facilitator so that he can manually intervene, and an intervention logic component 20 that provides for automated intervention actions. It is possible to implement a system where the intervention control consists only of an intervention configuration interface, or only of an intervention logic. Furthermore, in the illustrated example where both are present, the tasks shared between the two can be varied, to give flexible tailored interventions as appropriate. The facilitator can choose which intervention actions are to be carried out automatically by the intervention logic 20, and which are to remain under manual control via the intervention configuration interface 18.

The system of FIG. 1 also comprises an optional monitoring system 22 for assessing the performance of the user of the software application 10 in achieving the relevant learning objective. The monitoring system 22 is informed by a learning objectives component 24 and is used for monitoring the user view 14 and the application logic 12, as will be discussed in more detail below.

In one embodiment, the monitoring system 22 can generate an alarm for the intervention control. This alarm can be provided to the facilitator or be in the form of a command sent to the intervention logic component for an automatic response. The command sent can be an instruction to generate, select or configure any of a cue, an application control, a view, or a communication action.

The alarm can be based on the user's monitored performance in the software application, based for example on his learning objectives, as well as specific user actions, the state of the software application and logged historical information. The alarm can also be based on monitoring any of an activity or inactivity level, the exploration by the user of unknown territory, the action by the user of going around in circles or repeating unsuccessful actions, explicit user requests for intervention, usage of peer support, progress over time and achievement rate, and difficulty level of software application.

Furthermore, a user or a facilitator of the software application can set a preference for a level of intervention to be provided, said preference for example being based on the variation of learning objective thresholds that define when the monitoring system triggers the alarm, or on other measures such as time intervals for assistance to be provided or the variation of skill levels.

The system of FIG. 1 can be physically implemented in a variety of ways, and the scope of the invention is not intended to be limited to any one particular arrangement. As examples, the system can be distributed over one or more computing nodes, in either a client-server or a peer-to-peer network environment, with appropriate communication links being provided between the various components of the system, and between the various components of the software application, that is, the software application 10 can also itself be distributed so that the facilitator view 16 is provided at a location remote from the user view 14.

There are many ways in which the monitoring system 22 and the learning objectives component 24 can function. Learning objectives can be managed to allow a players' performance within a software application to be monitored and assessed by a learning manager, facilitator or automatically by the learning application itself. An example embodiment of the learning objectives component 24 will now be described.

The learning objectives component 24 is a key part of a method of in-use assessment, providing a suite of design tools and assessment tools that allow a learning manager to define their own assessments according to their needs and the needs of the participants for any given application, rather than in previous applications in which the learning objectives are restricted by the application itself.

A learning objective controller is provided that manages all learning objectives that are defined for a learning application event and handles requests from other platform components that relate to them. These activities include one or more of the following:

Installing designer defined learning objectives (LOs)
Assigning learning objectives to either players or teams
Evaluating completion conditions for any assigned learning objective (with reference to a measured objective controller which communicates with the application logic 12.
Evaluating learning objective outcome activities for completed learning objectives.
Instructing appropriate learning objective outcome activities to be invoked for a user.
Store and retrieving learning objectives and learning objectives assignments via a "storage manager" component (not shown).
Provide a list of learning objectives and their details on request.
Updating the appropriate profile/s when a LA session ends.
Saving and restore the LO controller state on request.

A learning objective interface is also provided that gives a Learning Objective Assignment programming interface for assigning or un-assigning a player or team with a learning objective that has been defined by the learning application designer.

The measured objective controller referred to above manages all measured objectives that are defined within an application and handles requests from other platform components relating to them. The measured objective controller may be responsible for one or more of the following:

Understanding the measured objectives that are defined within the application.

Receiving updated measurement values from the application for all measured objectives.

Maintaining a list of current measurements for all measured objectives.

Collating multiple measurement values and calculating a single measurement value for measured objectives involved with team based learning objectives.

Receiving notifications to start or stop measured objectives from the application.

Maintaining a list of current measurement status (started or stopped) for all measured objectives.

Providing the current measurement values for all measured objectives.

Providing the current measurement status for all measured objectives.

Providing a timer for timed measurements.

During the design of a game, the designer specifies a number of application measurements, which are combined to form a measured objective. The application measurements can comprise any variable or parameter within the game as defined by the designer, which can include an incrementable counter, a value, a floating point, a string, a Boolean operator or a timer.

In general, a game may comprise a number of objects, attributes, internal relationships and an environment, with interactions being governed by a set of rules. For example, a game typically comprises an environment defining boundaries for game activities, one or more user-controlled agents, computer controlled agents and computer controlled environmental parameters. The application measurements can comprise any variable within this and any other scheme, including any of the environmental parameters and any characteristic which is allocated to the user-controlled agent, or to the computer controlled character.

As a further specific example, a game environment could comprise a jungle area which comprises a river portion and the user controlled agent could comprise a human explorer, so that the river portion defines a portion of the environment that the explorer cannot walk on. An environmental parameter could comprise a population density of piranha fish in the river, and the computer controlled character could comprise one or more lions. The application measurements could then comprise the strength and speed of the explorer, the strength and speed of the lions, the population density of the piranha fish, the speed of water flow in the river, and so on.

Each application measurement is defined by a name, a unique identifier, a description and a measurement type, as mentioned above. It is typical that three types are available—counter, value and duration.

The application designer then specifies a number of measured objectives, giving each of them a name, a unique identifier, a description, and a list of application measurements used to form the measured objective. Each measured objective has a clearly defined start and end point. For example, the measured objective could be the time taken to complete various tasks, or the count of a particular parameter once a task has been completed.

The application designer also specifies a number of outcome activities which are to be supported by the application. The outcome activities are references to executable logic within the application script. An outcome activity will be invoked when an outcome condition is satisfied. This can be done automatically during the performance of an application event. Each outcome activity definition includes a unique name and a value (expressed in terms of the application measurements) for the outcome activity, and a description of the logical behaviour to be performed by the outcome activity.

The learning manager can then create a learning objective (LO) by selecting one or more measured objectives and one or more outcome activities which are made available by the designer, and by defining outcome conditions which specify objective thresholds to be applied to the associated outcome activities.

The learning manager then requests and obtains a list of all application commands defined within the application script, and associates an outcome activity to each outcome condition defined. The outcome activities can for example be one of the following: An application command; Write to a players profile; Create a reflection or debrief agenda item.

The learning objective is defined as a combination of the measured objectives and chosen outcome activities, the invocation of which is described by one or more outcome conditions that specify, via a mathematical formula defined by the learning manager, a predetermined criteria expressed in terms of measured objectives which determines when the outcome activities should be invoked.

The facilitator or learning manager makes a qualitative decision as to the definition of a learning objective based on particular thresholds and combinations of one or more measured objectives. For example, in the above jungle game, a player may be part of a team (of computer generated or other player controlled characters), and a facilitator may want to assess as a learning objective how effective a player's team leadership skills. The facilitator therefore can construct a learning objective to measure team leadership by selecting the measured objectives of the number of survivors crossing a river, the final strength of players that survive, and the time taken to complete a river crossing are evaluated, and then, for example, the team leadership could be assessed as a weighted combination of the measured objectives, with a particular objective deemed to be more important than another objective being given a higher weight in the calculation. The learning objective can be defined either before a learning application event begins or during the performance of a learning application event.

In a further example process, a user's application actions are measured against a learning objective. When the player performs an application action, the application script determines and performs an appropriate response, the possible responses being for example: Do nothing; Start or stop a timer; Increment or decrement a counter; Store a value; or Complete a measured objective.

When measured objectives are started, measurements are made by the platform only if a learning objective contains the measured objective and that learning objective is assigned to a user. Assignment of a learning objective to a user indicates that the platform should no longer ignore measurements for a started measured objective.

The system then determines whether any learning objectives have ended. For all completed learning objectives, the system evaluates the outcome conditions to determine which outcome activity to perform, instructing the application script as appropriate. For all outcome conditions met, the system records the outcome condition in either the user or team profile, as appropriate.

That is, in the above example, after the river crossing is complete, the learning objective is assessed and the appropriate outcome conditions are evaluated. Depending on the outcome conditions, a different outcome is selected which results in a particular command being carried out. For example, based on the combination of the measured objectives, the facilitator can calculate an overall score for a player's team leadership skills. If this score is over a predetermined threshold, the player can be passed to the next level of the game, or to have the difficulty increased by varying the game's configurable information (for example, increasing an application measurement such as the number of piranhas in the river), or if below, he can be asked to repeat the task.

It will be appreciated that the same jungle game could then be used to assess different learning objectives, for example, jungle survival skills, aggressiveness, decision making, and so on. The interfaces and components of the learning objectives component 24 and the system in general provide the tools and the environment for one or more facilitators to define a predetermined assessment method of any chosen learning objective within the context of any one application.

The outcome conditions are preferably evaluated by the platform in the order specified when a measurement is made and when a measured objective has been stopped. Consequently, learning objectives that are specified by a learning manager are started and stopped implicitly when the measured objectives used are started and stopped. The actions, timings and cues for the starting and stopping of measured objectives are typically specified by the application designer within the application script, which determines whether a learning objective is assessed at the behest of the facilitator, or automatically, or a selectable combination of both. It may be possible for a measured objective to be attempted more than once, in which case the platform will store the previous values of the measured objective measurements and reset to initial values.

Once defined, all learning objectives can be assigned or unassigned to either players or teams throughout a learning application event. Whenever a learning objective is assigned or unassigned to a user, a historical record of the assignment and ultimately the learning objective results within that LA event can be stored within the user's profile. When a learning objective is assigned to a team, this historical record can be stored within the team's profile, and measurements made by the learning application contained within the learning objective becomes valid.

It is of course possible that during a learning application event the measurement of one measured objective may contribute to more than one learning objective and that a single learning application event can give data for the assessment of more than one learning objective. The outcome activities are performed on the basis of a command actioned by the achievement of the threshold of the measured objective. When a measured objective has been stopped the outcome conditions are evaluated in specified order.

It is to be appreciated that the learning objectives can be assessed as part of a single user or a multi-user application, without restriction. The objectives can be assigned to one particular user or to a team in general, for a fully flexible assessment environment.

Another exciting feature provided by this solution is the run-time interaction of the assessment. The assessment can be carried out while an application event is running and the facilitator can determine the feedback appropriate to the achievement and the situation, and then issue an application command that will change the application as needed, either by an automatically invoked command set out in the application script or by direct intervention.

In summary therefore, with this interactive method of in-game assessment, the monitoring system 22, as informed by the learning objective component 24, monitors the performance of a user in a quantifiable way. This assessed performance can then be used to determine whether a player is having particular problems with a given task. When problems arise an alarm can be sent to alert the facilitator, or an automatic response can be triggered. The scale of the problem can also be indicated based on the quantified measurement of the user's performance. The monitoring can be done at regular time intervals or it can be triggered by the player reaching key points in the game, for example when the player is approaching a very difficult task which is likely to require guidance, or it can be triggered by various use conditions, such as the user being idle for a period of time, say one minute.

In a further aspect of the dynamic intervention with the software application, the intervention control comprises a cues component which dynamically interacts with the application logic 12 of the software application 10. A cue can be provided when a help condition is triggered (for example by the methods described above) or at any other point as chosen by a facilitator, so that he can intervene if a user is performing badly. The facilitator can in one embodiment design and generate his own cues, or he can select a cue from a list of predefined options. In another alternative, the parameter values of the cues can be configured by the intervention logic component 20 or by the intervention control in general.

The cues can be generated as an object for use in the software application, that is, a direct intervention in the application logic 12. The cues can be visual, audio or haptic. For example, a visual cue could comprise the addition to the application environment of arrows pointing in the right direction, pebble tracks laid on the ground or visualisation of sequences of actions to be performed. A visual cue could also take the form of textual advice. This is in contrast to known pop-up boxes, because the text is inserted directly into the application environment as an object of the application. The text could be textured or wrapped around a game object. Audio cues can for example comprise an additional sound file to be played or a sound file to be triggered when a particular action is taken during the course of the application event, or the voice of the facilitator (to enable this, the intervention control is provided with audio or visual communications system or component). Haptic cues can comprise vibrational cues or cues that make use of shape, weight, material or texture information.

The cues can optionally be context-sensitive. The arrangement or form of a cue can be computed in relation to a point of reference or an environment of the software application, and the relation between the cue and the environment of the software application can be proximity, orientation, relative location, absolute location, presence or absence of other objects and/or users; or size, geometry, colour, texture, shading, transparency, material, contrast, or brightness the arrangement or form of the cue can also involve temporal aspects such as appearance time, lifetime, flash rate, number of repetitions, speed, velocity, or dynamic resizing.

As an example, when the user makes a change to his orientation in the application by rotation or translation, the cue adjusts its orientation to take into account the varying position and view of the user, for example by rotating.

The cues can also be user or learning-objective sensitive, depending on any of past achievements of a user, current objectives being assessed, target achievements, or schedules for teams or users, and can be used by or configured for a single user, a team, or a group of users.

For the distributed system, where user and facilitator machines are connected over a network at potentially remote locations, an update mechanism optimises the communication between nodes in terms of amount of data transmitted, frequency and latency. The update mechanism includes for example one or more of the following features: the usage of low-overhead protocols like UDP, clustering of messages containing update information into (larger) packets which are close to the fixed packet-sizes of the protocol used, priority mechanisms ensuring that high priority update information like user avatar updates are treated preferentially, compression of update information, best network route finding to ensure using network segments with low latency, and usage of prediction algorithms when network anomalies occur.

A further aspect of the dynamic interaction with the software application is the ability for a user's view to be replicated on a third party's display from the perspective of a user, a designer defined camera or from a free-camera by the transmission of display signals which can comprise the requisite image data in compressed or uncompressed form to reconstruct the display.

This functionality is supported by an application view component provided as part of the intervention configuration interface 18, which comprises a view interface allowing a facilitator to see the application from any of the camera views made available by the application, and a view controller that manages the available camera views defined by the application to support the generation of a user view that optionally includes a head-up-display (HUD).

The view interface comprises a facilitator view selection interface that provides the facilitator of an application with a collection of GUI panes permitting him to choose to view the application from one of the designer defined cameras, from the perspective of any of the participating users, or from a free-camera view, and to start and stop presentation of the selected view of the learning application. The view is updated in synchronisation with the events occurring in the learning application.

The view controller provides a list of cameras available for the application, and acts to start and stop views of the application. It provides (and removes) a position from which a facilitator can view an application, and enables display and HUD information to be sent to and from a facilitator.

A user's general view of the software environment is then reproduced by sharing the camera position information, camera orientation, camera viewing angle and details of application objects for example, an object which represents a virtual environment or virtual world, like the landscape, user avatars, weather, buildings, flora and fauna. The reproduced views can include part or whole of a two dimensional or three dimensional virtual environment and user interface controls, and a defined camera view.

In a distributed software application, there is a privileged account for one or more facilitators. When a facilitator connects to such a distributed software application, he is notified of all connected users and thereafter he is notified when any user connects to or disconnects from the application.

Display signals can be sent to the facilitator including multiple views sent by one user, or multiple views sent by multiple users. In this case, the facilitator can view the multiple views in a tiled or stacked window arrangement.

In a further aspect of the dynamic intervention, the intervention control can comprise a control component that also allows the facilitator to take over control of the user's game for the demonstration to the user of how a particular task should be performed, by the transmission of appropriate control signals. This "dual control" aspect allows direct coaching in a novel way. In preferred embodiments, the level of control that is given up to the facilitator can be scalable. The facilitator can then issue commands for the amendment of the view and for the transmission of application control signals.

The control component can allocate the usage of controls within the software application to any of the user, the facilitator or to the intervention logic component 20. The controls that are available can be predefined and selectable by the facilitator or by the intervention logic component 20. A predefined control can have its parameter values configured by the facilitator or by the intervention logic component 20. The types of control can for example include a range of user interface controls comprising one or more of menus, single buttons, radio buttons, sliders, 2D (x-y coordinate) input means, 3D (x-y-z coordinate) input means, waypoints input means, text, avatar or virtual character control means for head, body, hands, legs, objects carried by avatar, objects held in hand, object manipulation in the environment, virtual vehicle control means including direction, speed), and virtual creature control means.

The control component can also further comprise a conflict arbitration logic component, which defines rules for determining an outcome control allocation in the case where two or more control actions are exercised simultaneously that conflict with one another. The arbitration logic can assign different priorities to the user, the facilitator or the intervention logic component 20, and can also use the majority, minority, or minimum percentage of user actions ascertained in a poll of users, e.g. when putting an issue, question or decision to a vote for a group or team of users.

A feedback mechanism can also be put in place, which informs the user if and in which mode a facilitator is connected to their machine, or informs a facilitator if and in which mode a user is connected to the software application The facilitator has a selection mechanism which can be used to select which components of the player application can be monitored or controlled. Components of the user application to be monitored include user interface elements, such as menus, sliders, 2D orientation maps, and typically a view of the 3D environment as the user sees it. This can also include the sound effects, communication between players, voting systems, team management systems, and haptic effects, e.g. when using haptic joysticks the facilitator could remotely feel the same motions as the user.

On the player machine, a feedback mechanism tells the player which controls are handled by the facilitator and which controls are available to the player. The feedback mechanism can be for example a change of colour or other property of a selected portion of a control panel of a game object.

This is particularly useful for simulations of complex systems. For example, if a user was training to learn to drive a car the dual control could apply to the gear selection, but could leave the steering in control of the user. This is enabled by grouping the user interaction with the learning applications into subsets of commands that can be carried out and then the dual control is applied only to specific selected commands or specific selected groups of commands. In this way the dual control is scalable in its severity and enables a further customisation of the learning experience. In an office environment the facilitator can "walk-through" a particular office task for a user and in a games environment a games facilitator can show them directly how a particular game should be performed. This can be done in conjunction with the provision of cues as well.

It will be appreciated that the distance between the facilitator and the players is irrelevant and so this provides a very useful dynamic remote method of tutoring.

It will also be appreciated that the system as described above provides for a facilitator can view and intervene in one or more software applications at the same time, and that a user can temporarily or permanently assume the role of a facilitator in a peer support capacity.

The system can also make use of user profiles which are of a form that can be correlated between different learning applications. These "portable" user profiles are in the form of scripts, or instruction sets, provided as part of the software application that compare learning objectives stored in a profile with learning objectives offered by the software application, using their calculated relevance to each other to act as a system for adapting the software application and/or updating the user profile in accordance with the determined relevance, for example by applying a weighting factor to at the existing experience data in the user profile related to the learning objective of the software application or to performance data related to the subsequent use of the software application. The relevance can for example be calculated on a semantic basis, wherein a semantic profiling component is provided which determines a quantitative similarity of meaning between the first input learning objective and the second input learning objective for use as the relevance.

It will be appreciated that a software application for the implementation of the above system can be stored on a computer readable medium such as a memory device or a carrier signal. The software application would include a set of instructions in machine readable code for carrying out the various steps and procedures described above. The various processes can be separated into modules or components that interact as described.

A second embodiment of an environment for the application of the invention will now be described. It is to be appreciated that, as for the previously described embodiment, other systems apart from this can be used and within this system it is to be understood that not all of the illustrated components are essential. The true scope of the invention is to be understood with reference to the accompanying claims.

Figure 2:
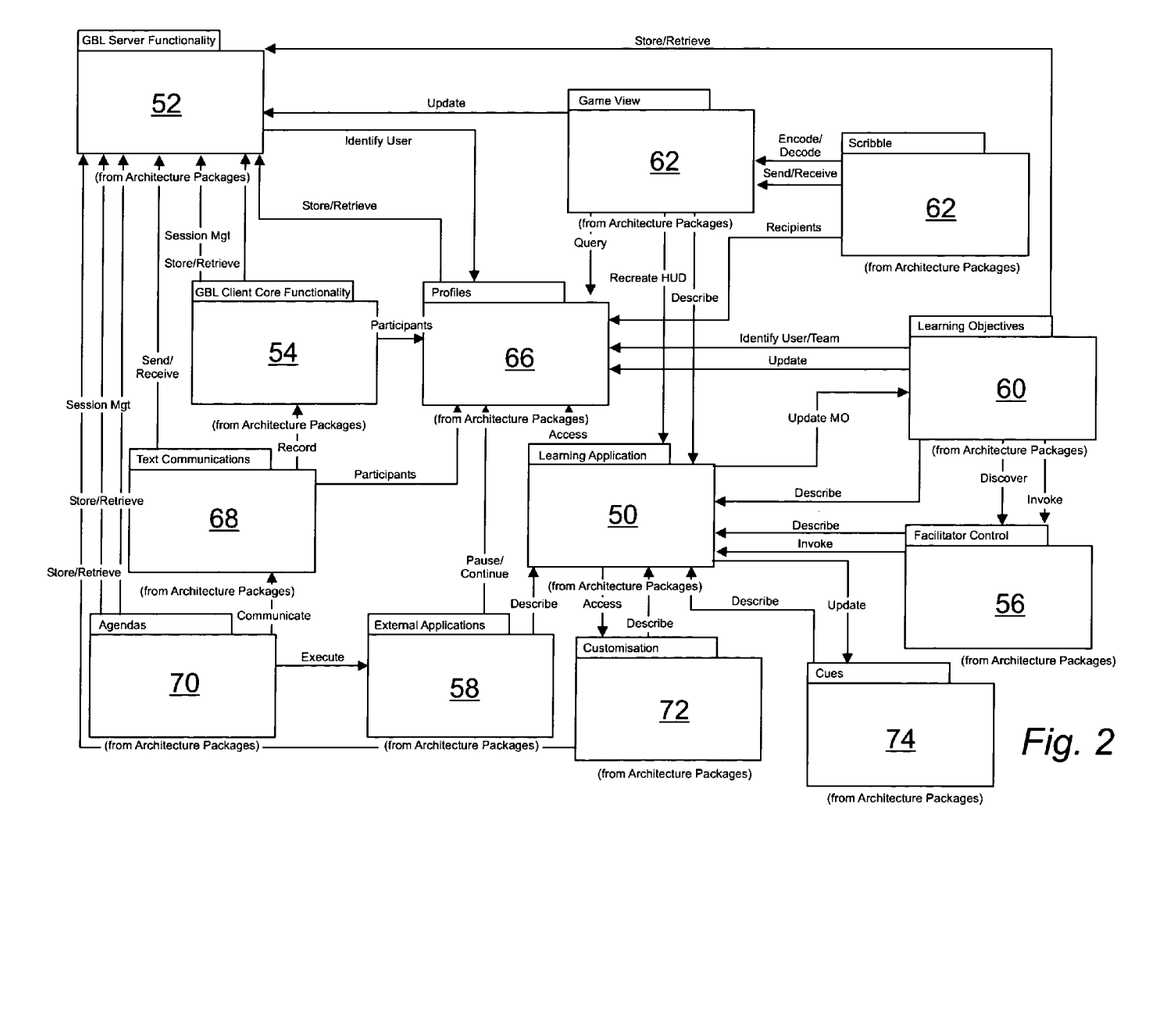
FIG. 2 illustrates a system embodying a second embodiment of the invention.

FIG. 2 shows a general system architecture for a games-based learning (GBL) platform. A learning application 50 is a distributable virtual environment that provides immersive educational content and is executed on the GBL platform. It is to be understood that the system of FIG. 2 is only one possible example of a system for the implementation of the invention. Other systems apart from those shown in FIG. 2 can be used, and within the system of FIG. 2, it is to be understood that not all of the illustrated components are essential. The true scope of the invention is to be understood with reference to the accompanying claims.

The GBL server functionality 52 exists alongside an existing game engine server and extends the functionality offered by an existing game engine to enable learning applications to handle multiple players.

The GBL client core functionality 54 comprises components that exist within all users' clients that are participating within a given learning application event (LAE) and encompasses functionality that is either fundamental to the operation of a user's client or common across all the user clients.

The facilitator control component 56 allows a facilitator to initiate designer specified commands within a learning application, and allows a facilitator to present information or tutorials to any player participating within the learning application, and provides solutions to support learning objective outcomes.

The external applications component 58 allows a learning application to execute an external application, other than the learning application itself, on the players' consoles, and allows a facilitator to launch an external application for the purpose of assessing a player participating within the learning application.

The learning objectives component 60 allows a players' performance within a learning application to be monitored and assessed by a learning manager, facilitator or the learning application. A learning manager can create and modify learning objectives within a GBL application to better fit with the needs of a particular organisation or individual. These learning objectives can then be assigned to players or teams to monitor and assess performance.

The game view component 62 allows the facilitator to view the learning application from the perspective of a player, a learning application (LA) designer defined camera or from a free-camera and allows a facilitator to provide assistance to players in various ways, including by dynamically intervening in the player's runtime experience.

The scribble component 64 interacts with the game view component 62 to allow a facilitator to provide assistance to players by drawing a freehand image which will be superimposed over their learning application's user interface in real-time The text communications component 68 allows user-to-user text communications during learning application events (the functionality offered by the chat window feature will only be available to its users if the learning application designer makes an area of the learning application's user interface available to be used for text communications). It also allows a facilitator or team leader to hold a meeting between all the members of a team defined within a learning application event, and a debrief feature that debrief feature encourages an individual or team to reflect on progress within the learning application event by providing the ability for a learning application to present reflection agenda item to the player in a consistent and structured manner at game selected points. The debrief feature also provides the ability for the facilitator to be able to assess an individual's performance by observing how they respond to the reflection agenda item.

The profiles component 66 allows for the creation and modification of player profiles for players who are users of the GBL platform and are able to participate within learning application events, which can be used to monitor and assess a player's performance within these events, and provides a team management feature which allows the facilitator to define groups of cooperating players within a learning application event and create a team profile that can be used to monitor that team's performance within the event.

The agendas component 70 allows a facilitator or team leader to hold a meeting between all the members of a team defined within a learning application event, and a debrief feature that encourages an individual or team to reflect on progress within the learning application event by providing the ability for a learning application to present reflection agenda items to the player in a consistent and structured manner at game selected points. The debrief feature also provides the ability for the facilitator to be able to assess an individual's performance by observing how they respond to the reflection agenda item.

The customisation component 72 provides the ability for a learning manager, facilitator or SME (small-to-medium size enterprise) to customise a learning application based upon any configurable items specified by the learning application designer in order to achieve a higher level of authenticity and appropriateness for a particular organisation and tailor a particular learning event for a particular individual, set of individuals or teams.

The cues component 74 allows the learning application designer to provide help or status relating to the game elements of the learning application in a non-intrusive (to learning application flow) manner. The information to be presented will be located within the proximity of the object within the learning application.

Figure 3:
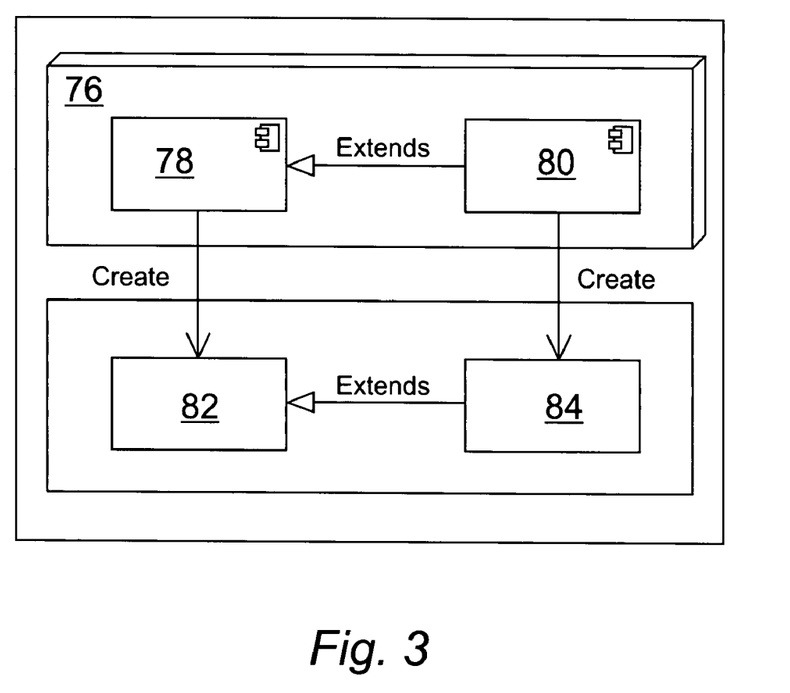
FIG. 3 illustrates a developer deployment environment for the system of FIG. 2.
Figure 4:
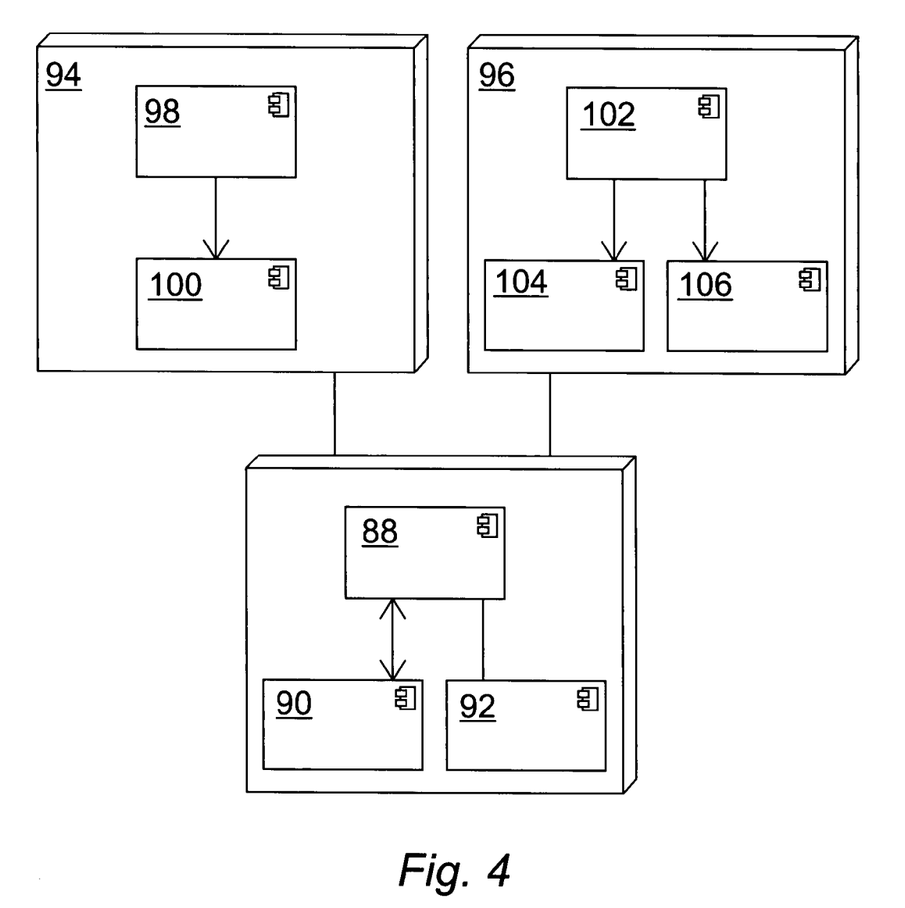
FIG. 4 illustrates a runtime deployment environment for the system of FIG. 2.

The component deployment is flexible as the components are modular in nature. However, an example deployment is shown in FIGS. 3 and 4. In a general sense, the GBL platform supports a developer deployment environment for the production of learning applications, shown in FIG. 3 and a runtime deployment environment for the execution and monitoring of a learning application, shown in FIG. 4.

As seen in FIG. 3, in a developer environment a development computer 76 runs an existing game engine software development kit (SDK) 78 along with the GBL SDK 80, which provides an extension of the existing game engine SDK 78 relating to a set of learning extensions supported by the GBL SDK 80. The existing game engine 78 creates a game engine application 82 which can be extended by a GBL application 84 which is created by the GBL SDK 80.

FIG. 4 illustrates an exemplary runtime environment. A server computer 86 runs the game engine's server 88 which communicates with a server standalone player 90 that manages the multi-player aspects of a learning application. A connection is maintained with an ODBC compliant GBL database 92. The server computer 86 is linked (for example through IP communications links) to a player computer 94 and a facilitator computer 96. The player computer 94 is provided with a player standalone player 98 that executes a learning application 100. The facilitator computer 96 is provided with a facilitator standalone player 102 that executes a facilitator learning application 104 and facilitator application 106.

In an alternative runtime environment, the learning application 100 can be provided as a standalone program to be executed on the player's computer, so that no communications link to an outside server is required. In that scenario, the standalone player 98 comprises a "games based learning" program to be run on the player computer which provides games based learning functionality to the user's computer, including the storage of user profiles that are updated as the player uses different applications. The player can then choose different applications which he can purchase or download that are then played using the standalone player 98, and so his past performances in other applications can be stored on his computer for interaction with other applications as described below.

Within the architecture of FIG. 2, the learning objectives component 60, learning application 50, customisation component 72, cues component 74 and facilitator component 56 all function in a similar way to the corresponding components of the architecture shown in FIG. 1.

In summary therefore, the dynamic interaction with software applications and methods for altering or controlling a software application during runtime according to the invention provide numerous advantages and increased functionality. The system enables a facilitator or application assessor to observe a user's view of the software application. The observer or facilitator can view any information on a user's display, can provide cues to guide a user or take control of a user's application, to varying degrees.

The system described above may be configured as a computing application, a computing applet, a computing program and/or other instruction set operative on a computing system to perform the functions, operations, and/or procedures described above. An exemplary computing system is controlled in a known way primarily by computer readable instructions, which may be in the form of software, for performing the various steps, processes, and functions described above. The computer readable instructions can contain instructions for the computing system for storing and accessing the computer readable instructions themselves. Such software may be executed within one or more processing units, such as a microprocessor, to cause the computing system to do work.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computing environments maintaining programmable computers that include a processor, a storage medium readable by the processor (including volatile and non-volatile memory and/or storage elements), at least one input device, and at least one output device. Computing hardware logic cooperating with various instructions sets are applied to data to perform the functions described above and to generate output information. Programs used by the exemplary computing hardware may be implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Various improvements and modifications can be made to the above without departing from the scope of the invention.

The invention claimed is:

1. A system stored in a non-transitory computer-readable medium for teaching a learning objective, the system comprising:
 a software application comprising an application logic component that provides a user view and a facilitator view;
 intervention control arranged to interface directly with the application logic component; and
 a correlation component that correlates a user profile or a team profile to the software application, said correlation component comprising an instructions set for a computer comprising:
 a first system for interrogating the user profile and reading a first learning objective as a first input learning objective;
 a second system for interrogating the software application and reading a second learning objective as a second input learning objective;

a calculation component for determining a relevance of the first input learning objective to the second input learning objective, wherein said calculation component comprises a semantic profiling component adapted to determine a quantitative similarity of meaning between the first input learning objective and the second input learning objective for the use as the relevance; and a third system for adapting the software application in accordance with the determined relevance and updating the user profile in accordance with the determined relevance.

2. The system of claim 1, further comprising a monitoring system for assessing the performance of a learning objective.

3. The system of claim 2, wherein the intervention control comprises an intervention configuration interface and/or an intervention logic component that provides for an automated response to an output from the monitoring system.

4. The system of claim 1, being distributed over one or more computing nodes, and comprising a data communications system between at least the software application and the intervention control.

5. The system of claim 2, being distributed over one or more computing nodes, and comprising a data communications system between two or more of the software application, the intervention control and the monitoring system.

6. The system of claim 1, wherein the software application is distributed over one or more computing nodes and comprises a data communications system permitting communication between at least two of a facilitator, a user and the application logic component.

7. The system of claim 4, wherein the distributed environment is a client/server environment.

8. The system of claim 4, wherein the distributed environment is a peer-to-peer environment.

9. The system of claim 4, wherein the software application can be concurrently used by one or more users and zero or more facilitators.

10. The system of claim 1, wherein the software application is at least one of: a game, a learning application, a games based learning application or a training simulation.

11. The system of claim 1, wherein the intervention control comprises a cues component for the provision of cues to the user of the software application.

12. The system of claim 11, wherein the cues component comprises a cue controller interface arranged to receive input from the intervention control to directly configure and dynamically update the application logic.

13. The system of claim 12, wherein the cue controller interface allows the intervention control to generate a cue as an object for use in the software application.

14. The system of claim 12, wherein the cues are pre-defined and can be selected from a list by a facilitator and/or the intervention control.

15. The system of claim 12, wherein parameter values of the cues can be configured by the intervention control.

16. The system of claim 11, wherein the cues comprise one or more of: graphic elements, text elements, audio elements, video elements or haptic elements.

17. The system of claim 11, wherein the cues are context-sensitive.

18. The system of claim 11, wherein the cues are user-sensitive.

19. The system of claim 17, wherein the arrangement of a cue is computed in relation to a point of reference of an environment of the software application.

20. The system of claim 19, wherein the relation between a cue and the point of reference is one of proximity, orientation, relative location, absolute location, presence or absence of other objects and/or users.

21. The system of claim 17, wherein the particular form of a cue is computed in relation to an environment of the software application.

22. The system of claim 21, wherein the relation between a cue and an environment can be one of size, geometry, colour, texture, shading, transparency, material, contrast, or brightness.

23. The system of claim 17, wherein the temporal aspects of a cue are computed in relation to an environment of the software application.

24. The system of claim 23, wherein the relation between a cue and an environment can be one of appearance time, lifetime, flash rate, number of repetitions, speed, velocity, or dynamic resizing.

25. The system of claim 11, wherein the cues are learning objective-sensitive.

26. The system of claim 25, wherein a cue can depend on at least one of past achievements, current objectives, targets, schedule for a user or a team of users.

27. The system of claim 11, wherein a cue can be used by and/or configured for a single user and/or a group or team of users.

28. The system of claim 1, wherein the software application comprises an application view component for the transmission of display signals.

29. The system of claim 28, wherein the display signals comprise a view generated for the facilitator from at least one of: part or whole of any user's view of the application including the user's view of a two dimensional or three dimensional virtual environment and user interface controls, and a defined camera view.

30. The system of claim 29, wherein the display signals comprise multiple views from more than one user or teams of users.

31. The system of claim 30, wherein the multiple views are arranged in a tiled or stacked window arrangement on one or more screens.

32. The system of claim 28, wherein the display signals comprise one or more of: camera position information, camera orientation, camera viewing angle, and virtual environment objects.

33. The system of claim 28, wherein the display signals comprise compressed or uncompressed image data.

34. The system of claim 1, wherein the software application includes program code for facilitating audio and/or visual communication with one or more users.

35. The system of a claim 3, wherein the intervention control comprises a control component for allocating the usage of controls within the software application between two or more of the user, the facilitator and automatic control by the intervention logic component.

36. The system of claim 35, wherein the control component comprises a control interface arranged to receive input from the facilitator and/or from the intervention logic component to directly configure and dynamically update the application logic component.

37. The system of claim 35, wherein the control interface allows a facilitator to define and/or the intervention logic component to generate a control as an object for use in the software application.

38. The system of claim 35, wherein the controls are pre-defined and can be selected from a list by a facilitator and/or the intervention logic component.

39. The system of claim 35, wherein parameter values of the controls can be configured by a facilitator and/or the intervention logic component.

40. The system of claim 35, wherein the controls comprise a range of user interface controls comprising one or more of menus, single buttons, radio buttons, sliders, 2D (x-y coordinate) input means, 3D (x-y-z coordinate) input means, waypoints input means, text, avatar or virtual character control means for head, body, hands, legs, objects carried by avatar, objects held in hand, object manipulation in the environment, virtual vehicle control means including direction, speed), and virtual creature control means.

41. The system of claim 35, wherein the runtime control over any combination of the controls is dynamically assigned to any combination of: users, teams of users, facilitators, intervention logic component.

42. The system of claim 41, wherein the application logic component comprises a conflict arbitration logic component that determines the outcome in the case of simultaneous exercise of two or more control actions.

43. The system of claim 42, wherein the conflict arbitration logic component comprises one of: facilitator priority, user priority, intervention logic priority, or the majority, minority, or minimum percentage of user actions ascertained in a poll of users.

44. The system of claim 42, wherein the conflict arbitration logic component considers control actions within a specified time interval to determine the outcome.

45. The system of claim 35, wherein the software application comprises a feedback mechanism where the status of control by the facilitator control and/or the intervention logic component is displayed to the user.

46. The system of claim 35, wherein the software application comprises a feedback mechanism where the status of control by the user and/or the intervention logic component is displayed to the facilitator.

47. The system of claim 2, wherein the monitoring system is arranged to generate an alarm for the facilitator based on the user's performance in the software application.

48. The system of claim 47, wherein said performance in the software application is a quantified achievement of one or more learning objectives.

49. The system of claim 2, wherein the monitoring system is arranged to generate an alarm for the intervention logic component in order to trigger an automatic intervention response.

50. The system of claim 49, wherein the intervention response is a command to do one of: generate, select, configure, and takes effect on one or multiple of cues, controls, views, and communication actions.

51. The system of claim 47, wherein the intervention logic receives information about the degree of achievement of a user's learning objectives, user actions and the state of the software application, and determines alarms based on the information and logged historic information.

52. The system of claim 47, wherein an alarm is generated based on monitoring one or more of: an activity or inactivity level, the exploration by the user of unknown territory, the action by the user of going around in circles or repeating unsuccessful actions, explicit user requests for intervention, usage of peer support, progress over time and achievement rate, and difficulty level of software application.

53. The system of claim 47, wherein the said software application comprises one or more measured objectives formed from a related group of software application measurements; and is adapted for the assessment of a learning objective, said learning objective being formed from:

the selection of one or more measured objectives;
defined outcome conditions for the measured objectives; and
selected outcome activities that each invoke a command in the learning application.

54. The system of claim 1, wherein a user of the software application can set a preference for a level of intervention to be provided.

55. The system of claim 1, wherein a facilitator of the software application can set a preference for any user for a level of intervention to be provided.

56. The system of claim 54, wherein the user preference corresponds to a variation of learning objective thresholds that define when the monitoring system triggers the alarm.

57. The system of claim 1, wherein a facilitator can view and intervene in one or more software applications at the same time.

58. The system of claim 1, wherein a user can temporarily or permanently assume the role of a facilitator in a peer support capacity.

59. The system of claim 1, wherein said system for adapting the software application comprises instructions for applying a weighting factor to at least one of existing experience data in the user profile related to the learning objective of the software application and performance data related to the subsequent use of the software application.

60. A software application for use with the system of claim 1.

61. A computer program product comprising the software application of claim 60.

62. A method for teaching a learning objective comprising:
executing a software application comprising an application logic component that provides a user view and a facilitator view;
using an intervention control to interface directly with the application logic component; and
correlating a user profile or a team profile to the software application, wherein the correlating comprising:
interrogating the user profile and reading a first learning objective as a first input learning objective;
interrogating the software application and reading a second learning objective as a second input learning objective;
determining a relevance of the first input learning objective to the second input learning objective, wherein the determining comprises semantic profiling adapted to determine a quantitative similarity of meaning between the first input learning objective and the second input learning objective for use as the relevance; and
adapting the software application in accordance with the determined relevance and/or updating the user profile in accordance with the determined relevance.

63. The method of claim 62, further comprising the step of assessing the performance of a learning objective with a monitoring system.

64. The method of claim 63, wherein the intervention control comprises an intervention configuration interface and/or:
an intervention logic component that provides for an automated response to an output from the monitoring system.

65. The method of claim 62, being distributed over one or more computing nodes, and comprising the step of communicating data between at least the software application and the intervention control.

66. The method of claim 65 when dependent from claim 63 or claim 64, further comprising the step of communicating data between two or more of the software application, the intervention control and the monitoring system.

67. The method of claim 62, wherein the software application is distributed over one or more computing nodes and the method comprises the step of communicating data between at least two of a facilitator, a user and the application logic component.

68. The method of claim 65, wherein the distributed environment is a client/server environment.

69. The method of claim 65, wherein the distributed environment is a peer-to-peer environment.

70. The method of claim 65, wherein the software application is concurrently used by one or more users and zero or more facilitators.

71. The method of claim 62, wherein the software application is at least one of: a game, a learning application, a games based learning application or a training simulation.

72. The method of claim 62, wherein the intervention control comprises a cues component for the provision of cues to the user of the software application.

73. The method of claim 72, wherein the cues component comprises a cue controller interface arranged to receive input from the intervention control to directly configure and dynamically update the application logic.

74. The method of claim 73, wherein the cue controller interface allows the intervention control to generate a cue as an object for use in the software application.

75. The method of claim 73, wherein the cues are predefined and can be selected from a list by a facilitator and/or the intervention control.

76. The method of claim 73, wherein parameter values of the cues can be configured by the intervention control.

77. The method of claim 72, wherein the cues comprise one or more of: graphic elements, text elements, audio elements, video elements or haptic elements.

78. The method of claim 72, wherein the cues are context-sensitive.

79. The method of claim 72, wherein the cues are user-sensitive.

80. The method of claim 78, wherein the arrangement of a cue is computed in relation to a point of reference of an environment of the software application.

81. The method of claim 80, wherein the relation between a cue and the point of reference is one of proximity, orientation, relative location, absolute location, presence or absence of other objects and/or users.

82. The method of claim 78, wherein the particular form of a cue is computed in relation to an environment of the software application.

83. The method of claim 82, wherein the relation between a cue and an environment can be one of size, geometry, colour, texture, shading, transparency, material, contrast, or brightness.

84. The method of claim 78, wherein the temporal aspects of a cue are computed in relation to an environment of the software application.

85. The method of claim 82, wherein the relation between a cue and an environment can be one of appearance time, lifetime, flash rate, number of repetitions, speed, velocity, or dynamic resizing.

86. The method of claim 72, wherein the cues are learning objective-sensitive.

87. The method of claim 86, wherein a cue can depend on at least one of past achievements, current objectives, targets, schedule for a user or a team of users.

88. The method of claim 72, wherein a cue can be used by and/or configured for a single user and/or a group or team of users.

89. The method of claim 62, further comprising the step of transmitting display signals to/from an application view component of the software application.

90. The method of claim 89, wherein the display signals comprise a view generated for the facilitator from at least one of: part or whole of any user's view of the application including the user's view of a two dimensional or three dimensional virtual environment and user interface controls, and a defined camera view.

91. The method of claim 90, wherein the display signals comprise multiple views from more than one user or teams of users.

92. The method of claim 91, wherein the multiple views are arranged in a tiled or stacked window arrangement on one or more screens.

93. The method of claim 89, wherein the display signals comprise one or more of: camera position information, camera orientation, camera viewing angle), and virtual environment objects.

94. The method of claim 89, wherein the display signals comprise compressed or uncompressed image data.

95. The method of claim 62, wherein the method comprises the step of audio and/or visual communication with one or more users via the software application.

96. The method of claim 64, wherein the method further comprises the step of allocating the usage of controls within the software application between two or more of the user, the facilitator and automatic control by the intervention logic component, via a control component provided as part of the intervention control.

97. The method of claim 96, wherein the control component comprises a control interface arranged to receive input from the facilitator and/or from the intervention logic component to directly configure and dynamically update the application logic component.

98. The method of claim 96, wherein the control interface allows a facilitator to define and/or the intervention logic component to generate a control as an object for use in the software application.

99. The method of claim 96, wherein the controls are predefined and can be selected from a list by a facilitator and/or the intervention logic component.

100. The method of claim 96, wherein parameter values of the controls can be configured by a facilitator and/or the intervention logic component.

101. The method of claim 96, wherein the controls comprise a range of user interface controls comprising one or more of menus, single buttons, radio buttons, sliders, 2D (x-y coordinate) input means, 3D (x-y-z coordinate) input means, waypoints input means, text, avatar or virtual character control means for head, body, hands, legs, objects carried by avatar, objects held in hand, object manipulation in the environment, virtual vehicle control means including direction, speed), and virtual creature control means.

102. The method of claim 96, wherein the runtime control over any combination of the controls is dynamically assigned to any combination of: users, teams of users, facilitators, intervention logic component.

103. The method of claim 102, wherein the application logic component comprises a conflict arbitration logic component that determines the outcome in the case of simultaneous exercise of two or more control actions.

104. The method of claim 103, wherein the conflict arbitration logic component comprises one of: facilitator priority, user priority, intervention logic priority, or the majority, minority, or minimum percentage of user actions ascertained in a poll of users.

105. The method of claim 103, wherein the conflict arbitration logic component considers control actions within a specified time interval to determine the outcome.

106. The method of claim 96, wherein the software application comprises a feedback mechanism where the status of control by the facilitator control and/or the intervention logic component is displayed to the user.

107. The method of claim 96, wherein the software application comprises a feedback mechanism where the status of control by the user and/or the intervention logic component is displayed to the facilitator.

108. The method of claim 62, wherein the monitoring system generates an alarm for the facilitator based on the user's performance in the software application.

109. The method of claim 108, wherein said performance in the software application is a quantified achievement of one or more learning objectives.

110. The method of claim 62, wherein the monitoring system generates an alarm for the intervention logic component in order to trigger an automatic intervention response.

111. The method of claim 110, wherein the intervention response is a command to do one of: generate, select, configure, and takes effect on one or multiple of cues, controls, views, and communication actions.

112. The method of claim 108, wherein the intervention logic receives information about the degree of achievement of a user's learning objectives, user actions and the state of the software application, and determines alarms based on these information and logged historic information.

113. The method of claim 108, wherein an alarm is generated based on monitoring one or more of: an activity or inactivity level, the exploration by the user of unknown territory, the action by the user of going around in circles or repeating unsuccessful actions, explicit user requests for intervention, usage of peer support, progress over time and achievement rate, and difficulty level of software application.

114. The method of claim 108, wherein the said software application comprises one or more measured objectives formed from a related group of software application measurements; and is adapted for the assessment of a learning objective, said learning objective being formed from:
- the selection of one or more measured objectives;
- defined outcome conditions for the measured objectives; and
- selected outcome activities that each invoke a command in the learning application.

115. The method of claim 62, wherein a user of the software application can set a preference for a level of intervention to be provided.

116. The method of claim 62, wherein a facilitator of the software application can set a preference for any user for a level of intervention to be provided.

117. The method of claim 115, wherein the user preference corresponds to a variation of learning objective thresholds that define when the monitoring system triggers the alarm.

118. The method of claim 62, wherein a facilitator can view and intervene in one or more software applications at the same time.

119. The method of claim 62, wherein a user can temporarily or permanently assume the role of a facilitator in a peer support capacity.

120. The method of claim 62, wherein said system for adapting the software application comprises instructions for applying a weighting factor to at least one of existing experience data in the user profile related to the learning objective of the software application and performance data related to the subsequent use of the software application.

121. A computer readable medium having instructions encoded thereon that, when run on a computer, provides a system for teaching a learning objective that provide the steps of claim 62.

\* \* \* \* \*